(12) United States Patent
Liao

(10) Patent No.: US 12,729,754 B2
(45) Date of Patent: Sep. 8, 2026

(54) INERTIA FLYWHEEL ASSEMBLY AND SYSTEM THEREOF

(71) Applicant: INFINIFORCE, INC., Wilmington, DE (US)

(72) Inventor: Ming-Chen Liao, Wilmington, DE (US)

(73) Assignee: INFINIFORCE, INC., Wilmington, DE (US)

( * ) Notice: Subject to any disclaimer, the term of this patent is extended or adjusted under 35 U.S.C. 154(b) by 565 days.

(21) Appl. No.: 16/608,858

(22) PCT Filed: Apr. 27, 2017

(86) PCT No.: PCT/US2017/029857
§ 371 (c)(1),
(2) Date: Jun. 19, 2023

(87) PCT Pub. No.: WO2018/199956
PCT Pub. Date: Nov. 1, 2018

(65) Prior Publication Data
US 2024/0392864 A1 Nov. 28, 2024

(51) Int. Cl.
*F16H 33/02* (2006.01)
*F03G 3/08* (2006.01)
(Continued)

(52) U.S. Cl.
CPC ............... *F16H 33/02* (2013.01); *F03G 3/08* (2013.01); *H02K 7/02* (2013.01); *H02K 7/1004* (2013.01);
(Continued)

(58) Field of Classification Search
CPC ...... F16H 33/02; F16H 57/0006; B60L 50/30; B60K 6/105; F03G 3/08; H02K 7/1004; H02K 7/116; H02K 16/005; F16F 15/30
See application file for complete search history.

(56) References Cited

U.S. PATENT DOCUMENTS 3,955,429 A * 5/1976 Holden .................. A63H 29/20
74/64
11,381,132 B2 * 7/2022 Liao ....................... H02K 53/00
(Continued)

FOREIGN PATENT DOCUMENTS

CN 204419445 U * 6/2015 ............. Y02E 10/38

*Primary Examiner* — Thomas C Diaz
(74) *Attorney, Agent, or Firm* — HDLS IPR SERVICES; Chun-Ming Shih

(57) ABSTRACT

An inertia flywheel assembly and a system thereof are disclosed. The system includes a driving device, an inertia flywheel assembly, a transmission member, a flywheel monitor unit, an abort unit and at least one output device. The inertia flywheel assembly comprises a first inertia flywheel and at least one second inertia flywheel, each inertia flywheel has a flywheel body and an axle, the axle is fixed to the axis of the flywheel body, and the flywheel body could spin via the axle. The flywheel body is a streamlined body. A first transmission portion is disposed on the circumference of the flywheel body of the first inertia flywheel. A second transmission portion is disposed on the axle of each second inertia flywheel. The second transmission portion is coupled to the first transmission portion. The output device is coupled to the axle of the second inertia flywheel.

7 Claims, 10 Drawing Sheets

1

(51) Int. Cl.
*H02K 7/02* (2006.01)
*H02K 7/10* (2006.01)
*H02K 7/116* (2006.01)
*H02K 16/00* (2006.01)
*F16H 57/00* (2012.01)

(52) U.S. Cl.
CPC ........... *H02K 7/116* (2013.01); *H02K 16/005* (2013.01); *F16H 57/0006* (2013.01)

(56) References Cited

U.S. PATENT DOCUMENTS

| | | | | |
|---|---|---|---|---|
| 2006/0239827 | A1* | 10/2006 | Manning | H02K 15/50<br>417/1 |
| 2008/0054827 | A1* | 3/2008 | States | H02P 9/06<br>74/DIG. 9 |
| 2011/0079106 | A1* | 4/2011 | Liu | F16F 15/31<br>74/572.11 |
| 2013/0226419 | A1* | 8/2013 | Jensen | F16H 33/02<br>701/67 |
| 2017/0314640 | A1* | 11/2017 | Liao | F16F 15/30 |

* cited by examiner

INERTIA FLYWHEEL ASSEMBLY AND SYSTEM THEREOF

BACKGROUND OF THE INVENTION

1. Field of the Invention

The present invention relates to a power transmission assembly and a system thereof, and in particular, to an inertia assembly and a system thereof which enhance the efficiency of energy applications.

2. Description of the Prior Art

The present invention uses an inertia assembly which cooperates with conventional dynamic systems and power systems. For example, the present invention cooperates with conventional power systems, such as wind drive power generator, hydraulic power generator, solar cell power generator, renewable energy power generator, etc.

For thermal power generator and hydraulic power generator, energy is continuously provided to generate mechanical energy, and then the mechanical energy is transferred to electric power for public application. The power transmission assembly of conventional dynamic system consumes a lot of energy during transmission. That is not economic and environment friendly.

SUMMARY OF THE INVENTION

In the present invention, the inertia flywheel assembly is associated with a driving device. When the rotating speed of the inertia flywheel assembly is raised to a rated revolution, the output power of the driving device is reduced. Consequently, the energy consumption is reduced.

An objective of the present invention is to provide a power transmission assembly and a system thereof, and in particular, to an inertia assembly and a system thereof which enhance the efficiency of energy applications.

The present invention provides a system of inertia flywheel assembly, comprising: a driving device: an inertia flywheel assembly including: a first inertia flywheel and at least one second inertia flywheel, wherein each inertia flywheel has a flywheel body and an axle, the axle is fixed to an axis of the flywheel body and the flywheel body could spin via the axle; wherein a first transmission portion is disposed on a circumference of the flywheel body of the first inertia flywheel, a second transmission portion is disposed on the axle of each second inertia flywheel and is coupled to the first transmission portion: a transmission member connected between the driving device and the axle of the first inertia flywheel; and at least one output device connected to the axle of the at least one second inertia flywheel.

In an embodiment of the present invention, the system further comprises an electrical control unit connected to the at least one output device.

The present invention further provides an inertia flywheel assembly, comprising: at least one inertia flywheel having a flywheel body and an axle, wherein the axle is fixed to an axis of the flywheel body and the flywheel body could spin via the axle; and at least one transmission member coupled to the axle of one of the least one inertia flywheel; wherein the flywheel body is a streamlined body that is a spherical or an ellipsoid body having at least arc-shaped plate or a conical shape body having at least one straight line.

In an embodiment of the present invention, the angle is between 5 degree and 70 degree.

In an embodiment of the present invention, the angle is between 10 and 40 degree.

In an embodiment of the present invention, the at least one transmission member comprises a first transmission member, the at least one inertia flywheel comprises a first inertia flywheel and a second inertia flywheel, and the first inertia flywheel is coupled to the second inertia flywheel by the first transmission member.

In an embodiment of the present invention, the first inertia flywheel and the second inertia flywheel are configured to be coaxial or uncoaxial.

In an embodiment of the present invention, the at least one transmission member comprises a plurality of transmission members, such as a first transmission member and a second transmission member, the at least one inertia flywheel comprises a plurality of inertia flywheels, such as a first inertia flywheel, a second inertia flywheel and a third inertia flywheel, and the first inertia flywheel is coupled to the second inertia flywheel and the third inertia flywheel by the first transmission member and the second transmission member respectively.

In an embodiment of the present invention, the first inertia flywheel, the second inertia flywheel and the third inertia flywheel are configured to be partially coaxial, coaxial or uncoaxial.

In an embodiment of the present invention, the at least one transmission member comprises a plurality of transmission members, the at least one inertia flywheel comprises a plurality of inertia flywheels, and the plurality of inertia flywheels are coupled by the plurality of transmission members.

In an embodiment of the present invention, the transmission member is belt pulley set, chain pulley set or gear set. In an embodiment of the present invention, the flywheel body is a monolithic metal member or composed of a plurality of sheet materials.

In an embodiment of the present invention, the flywheel body has a diameter and a thickness, and the diameter is greater than the thickness.

The present invention further provides a system of inertia flywheel assembly, comprising: at least one driving device; the inertia flywheel assembly as claimed in claim 1 connected to the at least one driving device: and at least one output device connected to the inertia flywheel assembly.

In an embodiment of the present invention, the at least one driving device is directly connected to one inertia flywheel of the inertia flywheel assembly.

In an embodiment of the present invention, the at least one driving device, the inertia flywheel assembly and the at least one output device are integrated to a single member.

In an embodiment of the present invention, the at least one output device comprises a plurality of output devices.

In an embodiment of the present invention, the system further comprises an electrical control unit.

In an embodiment of the present invention, the system further comprises a system monitor unit for monitoring a status of the at least one driving device, the inertia flywheel assembly and the at least one output device.

In an embodiment of the present invention, the system further comprises an abort unit connected to the system monitor unit, wherein when the system monitor unit transmits an anomalous signal to the abort unit, the abort unit transmits an abort signal to the at least one driving device or directly stop the inertia flywheel assembly.

In an embodiment of the present invention, the system further comprises a plurality of dampers.

In an embodiment of the present invention, the system further comprising a flywheel monitor unit configured to detect rotating speeds of the inertia flywheels of the inertia flywheel assembly. The driving device comprises a the controller for controlling the driving device to provide an initial output to start the inertia flywheel assembly. When the rotating speeds of the inertia flywheels in the inertia flywheel assembly are raised to rated revolutions, the flywheel monitor unit transmits an adjusting signal to the controller to adjust the output of the driving device.

In an embodiment of the present invention, the flywheel body is a streamlined body that is a spherical body having at least arc-shaped plate or a conical shape body having at least one straight line.

BRIEF DESCRIPTION OF THE DRAWINGS

The disclosure will become more fully understood from the detailed description given herein below for illustration only, and thus are not limitative of the disclosure, and wherein.

DETAILED DESCRIPTION OF THE PREFERRED EMBODIMENT

Figure 1:
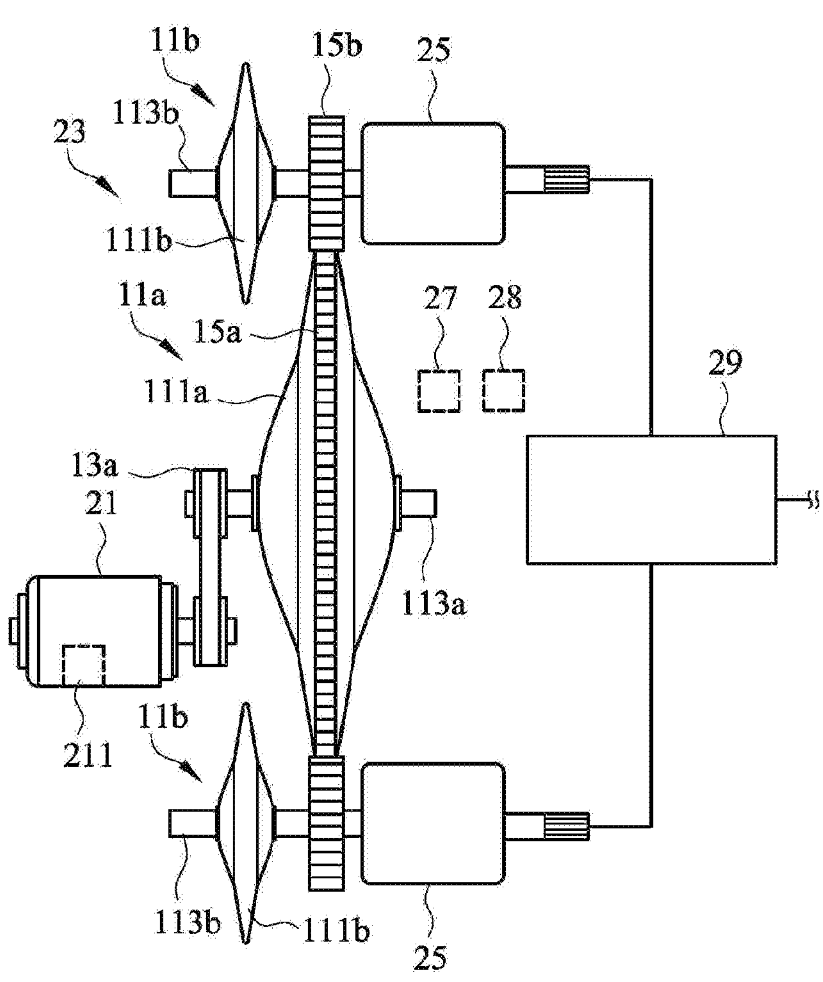
FIG. 1 is a schematic diagram of a system of inertia flywheel assembly in accordance with one embodiment of the present invention.

In the present specification, elements or devices with the same number comprise the same or similar configurations or functions. For better understanding, some conventional elements are omitted in the drawings. For example, bearings are not shown in the drawings that do not bother a person who is skilled in the art to understand the present invention.

The present invention discloses an inertia assembly which cooperates with conventional dynamic systems and power systems. Since the inertia assembly maintains a constant angular momentum after starting, the input energy is greatly reduced. The inertia flywheel assembly of the present embodiment comprises at least one inertia flywheel and at least one transmission member. The amounts of the inertia flywheels and the transmission members are dependent to the requirement of the system.

Figure 2:
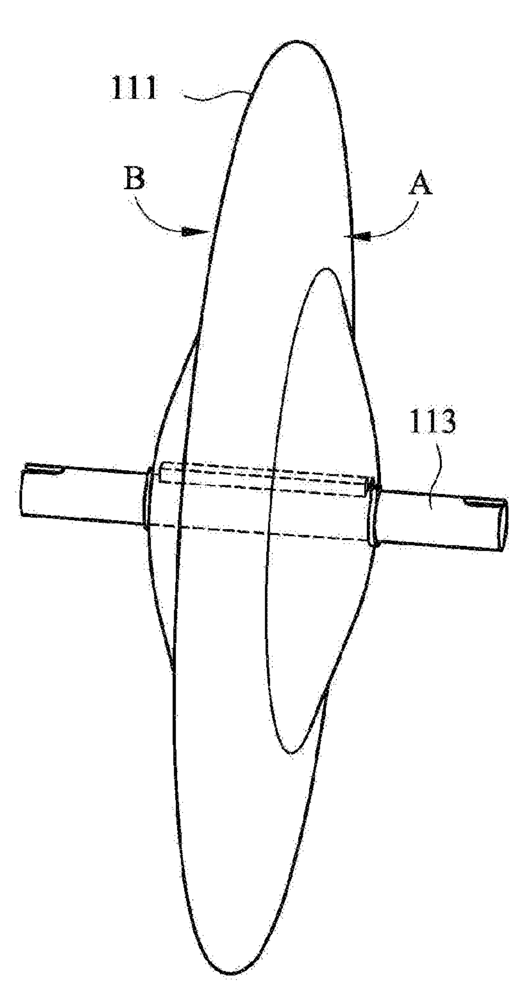
FIG. 2 is a schematic diagram of an inertia flywheel in accordance with one embodiment of the present invention.
Figure 3:
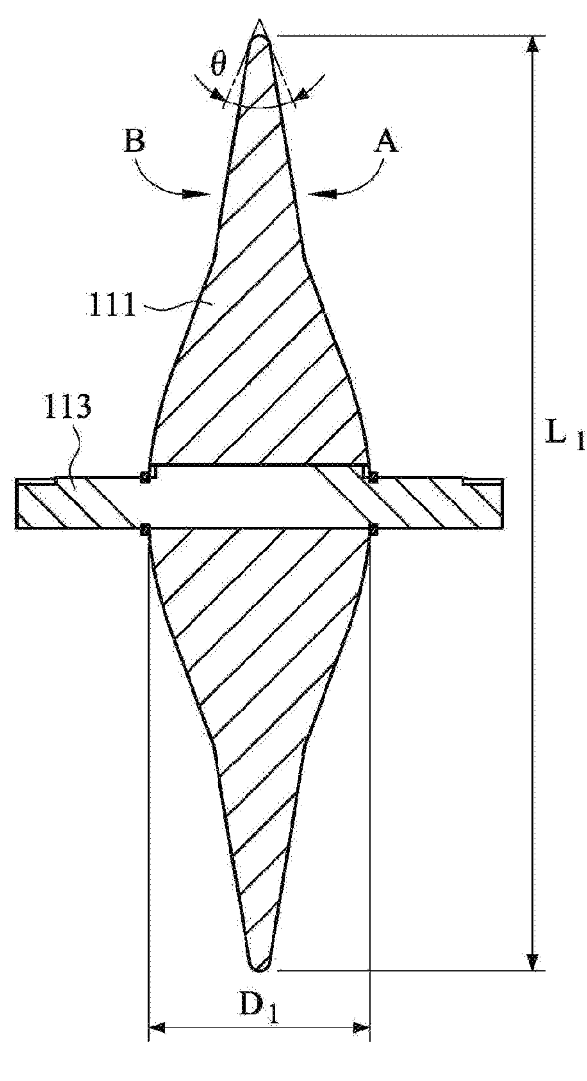
FIG. 3 is a sectional view of the inertia flywheel in accordance with the embodiment shown in FIG. 2.

Referring to FIG. 2 and FIG. 3, there are shown a schematic diagram and a sectional view of an inertia flywheel in accordance with one embodiment of the present invention. The inertia flywheel 11 includes a flywheel body 111 and an axle 113, and the flywheel body 111 could spin via the axle 113. The axle 113 is fixed to the axis of the flywheel body 111, and the axle 113 may be a signal axle or combination of a plurality of shorter axle. If the inertia flywheel 11 is associated with a transmission member, the transmission member is associated to the axle 113 and is coupled to the axle 113 to transmit mechanical energy.

In particular, the flywheel body 111 is a streamlined body or a streamlined arc body, such as an arc-shaped plate with a buckled center portion and a flat surrounding portion. For example, the thickness of the flywheel body 111 decreases from the center to the circumference. The diameter L1 of the flywheel body 111 is greater than the thickness D1 of the flywheel body 111. The surface of the flywheel body 111 is streamlined. Furthermore, the flywheel body can be monolithic metal member, hollow component with ore with higher specific gravity inside or composed of a plurality of metal sheets. In general, the conventional flywheel has a design contrary to the present invention. Most of the mass of the conventional flywheel is distributed on the circumference. Comparing to the conventional design, the inertia flywheel of the present invention has greater inertia mass.

The flywheel body 111 has a first curved surface A and a second curved surface B. The tangent planes of the first curved surface A and the second curved surface B include an angle Θ. The angle Θ is between 5 degree and 70 degree. More preferably, the angle Θ is between 10 degree and 40 degree. In an embodiment of the present invention, the flywheel body 111 has a diameter of 74 cm and weight of 230 kg. The size, material and weight of the flywheel body 111 can be modified according to the requirements.

Referring to FIG. 1, there is shown a system of inertia flywheel assembly in accordance with one embodiment of the present invention. As shown in the figure, the system 1 of inertia flywheel assembly comprises a driving device 21, an inertia flywheel assembly 23, a first transmission member 13*a* and at least one output device 25. The inertia flywheel assembly 23 comprises a first inertia flywheel 11*a* and at least one second inertia flywheel 11*b*. Each inertia flywheel 11*a* (11*b*) has a flywheel body 111*a*/111*b*, a first axle 113*a*, and a second axle 113*b*. The axles 113*a*/113*b* are fixed to the axis of the flywheel bodies 111*a*/111*b* respectively, and the flywheel bodies 111*a*/111*b* could spin via the axles 113*a*/113*b* respectively. The first flywheel body 111*a* and the second flywheel body 111*b* are streamlined arc bodies, such as arc-shaped plates, olive-shaped arc plates, disc-shaped arc plate or spherical bodies. In the present embodiment, a first transmission portion 15*a* is disposed on the circumference of the first flywheel body 111*a* of the first inertia flywheel 11*a*. A second transmission portion 15*b* is disposed on the second axle 113*b* of the second inertia flywheel 11*b*. The second transmission portion 15*b* is coupled to the first transmission portion 15*a*.

In one embodiment of the invention, the driving device 21 may include a controller 211 for controlling the output of the driving device 21. The first transmission member 13*a* is connected between the driving device 21 and the axle 113*a* of the first inertia flywheel 11*a* for transmitting the mechanical energy generated by the driving device 21 to the inertia flywheel assembly 23. The output device 25 is connected to the axle 113*b* of the second inertia flywheel 11*b*. Further, the system 1 may include a flywheel monitor unit 27 for determining the rotating speed of the inertia flywheels 11*a* and 11*b* in the inertia flywheel assembly 23.

The controller 211 controls the driving device 21 to provide an initial output to start the inertia flywheel assembly 23. When the rotating speeds of the inertia flywheels 11*a*, 11*b* in the inertial flywheel assembly is raised to rated revolutions, the flywheel monitor unit 27 transmits an adjusting signal to the controller 211 to adjust the output of the driving device 21. The controller 211 and the flywheel monitor unit 27 are optional devices in the invention, and are not limitation of the invention.

In one embodiment of the present invention, the system 1 further comprises an electrical control unit 29 connected to the output device 25. The driving device 21 is a motor or driving device which provides mechanical energy for driving the inertia flywheel assembly 23. The output device 25 may be an electric generator. The electrical control unit 29 may be a rectifier, a regulator, a transformer, a regulating/rectifying unit or a voltage/current transforming unit. The electrical control unit 29 receives electric energy and provides the electric energy to the system 1 itself or the other device. The other device may be an electric grid.

In one embodiment of the present invention, the first transmission portion 15*a* and the second transmission portion 15*b* are gears in mesh or friction wheels. The second inertia flywheel 11*b* is driven by the first inertia flywheel 11*a* via gears and/or friction wheels of the first transmission portion 15*a* and the second transmission portion 15*b*. The first transmission member 13*a* is a belt pulley set, chain pulley set or gear set.

In one embodiment of the invention, the system 1 further comprises an abort unit 28 to stop or slow down operation of the system 1 by friction, increasing load or cutting off power to protect system 1 or operator, as partial or all the system 1 is out of order.

Figure 4:
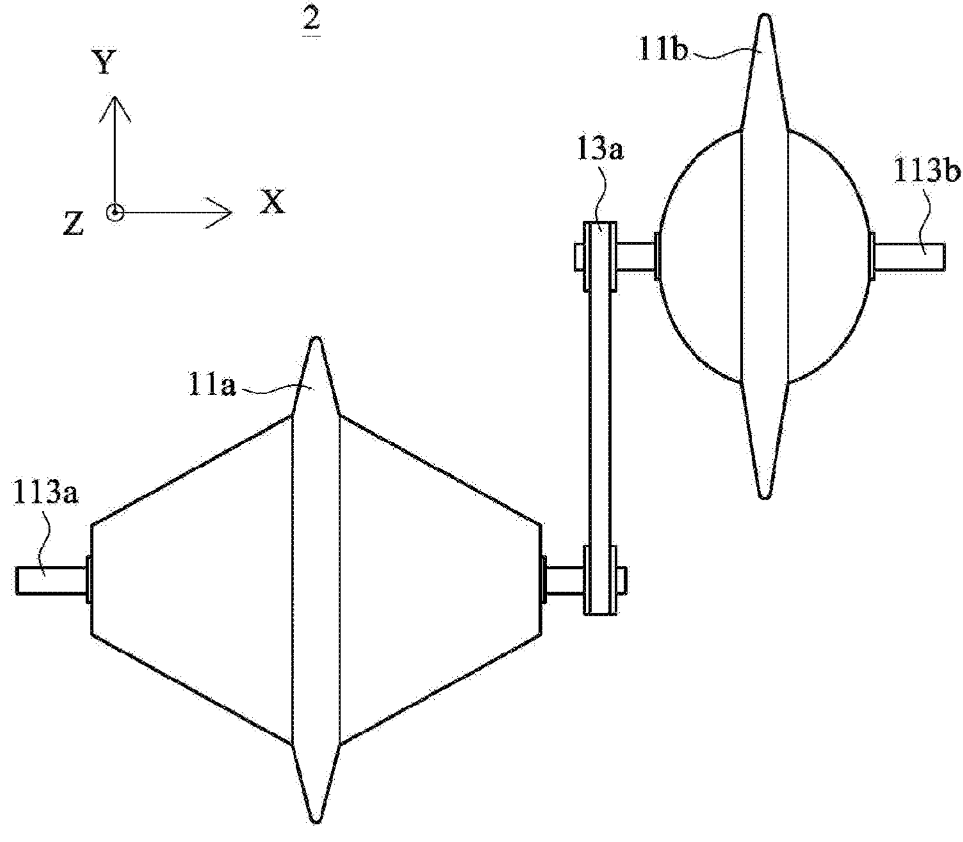
FIG. 4 is a schematic diagram of an inertia flywheel assembly in accordance with one embodiment of the present invention.

Referring to FIG. 4, there is shown a schematic diagram of an inertia flywheel assembly in accordance with one embodiment of the present invention. The present embodiment comprises two inertia flywheels and a transmission member. Two inertia flywheels may be a spherical or an ellipsoid body 11*b* having at least arc-shaped plate or a conical shape body 11*a* having at least one straight line. For example, the shape of the inertia flywheels on the XY cross section may be circular, oval or trapezoid, and the shape of the inertia flywheels on the XZ cross section may be circular, wherein X-axis, Y-axis and Z-axis are vertical coordinates.

In particularly, the inertia flywheel assembly 2 of the present embodiment comprises at least transmission member and at least inertia flywheel. More specifically, the inertia flywheel comprises a first inertia flywheel 11*a* and a second inertia flywheel 11*b*. The transmission member comprises a first transmission member 13*a*, and the first inertia flywheel 11*a* drives the second inertia flywheel 11*b* by the first transmission member 13*a*. The first transmission member 13*a* is belt pulley set, chain pulley set, gear set or other equivalent mechanical energy transmission member. In application, a motor is used to drive the first inertia flywheel 11*a* on the first axle 113*a* to overcome the static friction force and start to spin. For adjusting the rotating speed of the motor, an electronic or mechanical controller is connected to the motor. The first axle 113*a* drives the transmission member 13*a* to operate. Since the transmission member 13*a* is coupled to the first axle 113*a* and the second axle 113*b*, the second inertia flywheel 11*b* is driven to overcome the static friction force and start to spin.

In the present embodiment, the first inertia flywheel 11*a* and the second inertia flywheel 11*b* are configured to be uncoaxial, but in the other embodiment they may be configured to be coaxial, that should not be the limitations of the present invention. In the present embodiment, the second inertia flywheel 11*b* has the same or similar structures with the first inertia flywheel 11*a*.

Figure 5:
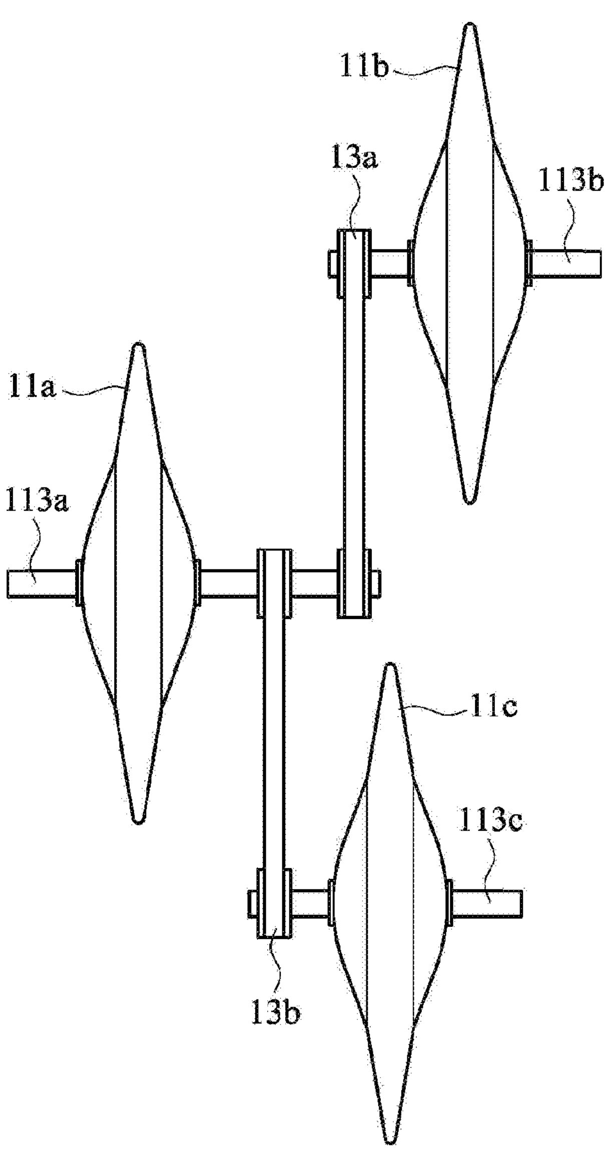
FIG. 5 is a schematic diagram of an inertia flywheel assembly in accordance with another embodiment of the present invention.

Referring to FIG. 5, there is shown a schematic diagram of an inertia flywheel assembly in accordance with another embodiment of the present invention. The present embodiment comprises three inertia flywheels and two transmission members. The inertia flywheel assembly 2 of the present embodiment comprises a first inertia flywheel 11*a*, a second inertia flywheel 11*b*, a third inertia flywheel 11*c*, a first transmission member 13*a* and a second transmission member 13*b*. Similarly, the first inertia flywheel 11*a* drives the second inertia flywheel 11*b* by the first transmission member 13*a* and drives the third inertia flywheel 11*c* by the second transmission member 13*b*. In the other embodiment, the third inertia flywheel 11*c* may be driven by the second inertia flywheel 11*b* via the second transmission member 13*b*. In other words, the first inertia flywheel 11*a* drives the second inertia flywheel 11*b*, and the second inertia flywheel 11*b* drives the third inertia flywheel 11*c*.

In the present embodiment, the first inertia flywheel 11*a*, the second inertia flywheel 11*b* and the third inertia flywheel 11*c* are configured to be uncoaxial, but in the other embodiment they may be configured to be partially coaxial, coaxial or uncoaxial, that should not be the limitations of the present invention. Moreover, the mass of the first inertia flywheel 11*a* is greater than the masses of the second inertia flywheel 11*b* and the third inertia flywheel 11*c*. It is easier for the first inertia flywheel 11*a* to drive the second and third inertia flywheels 11*b*, 11*c* to rotate, or maintain the rotating speed of the second and third inertia flywheels 11*b*, 11*c*.

In the present embodiment, the third inertia flywheel 11*c* has the same or similar structures with the first and the second inertia flywheels 11*a*, 11*b* and the second transmission member 13*b* has the same or similar structures with the first transmission member 13*a*.

Although FIGS. 2-5 illustrate embodiments with one to three inertia flywheels, that are not the limitations of the present invention. The amounts of the inertia flywheels and the transmission members are dependent to the requirements.

Figure 6:
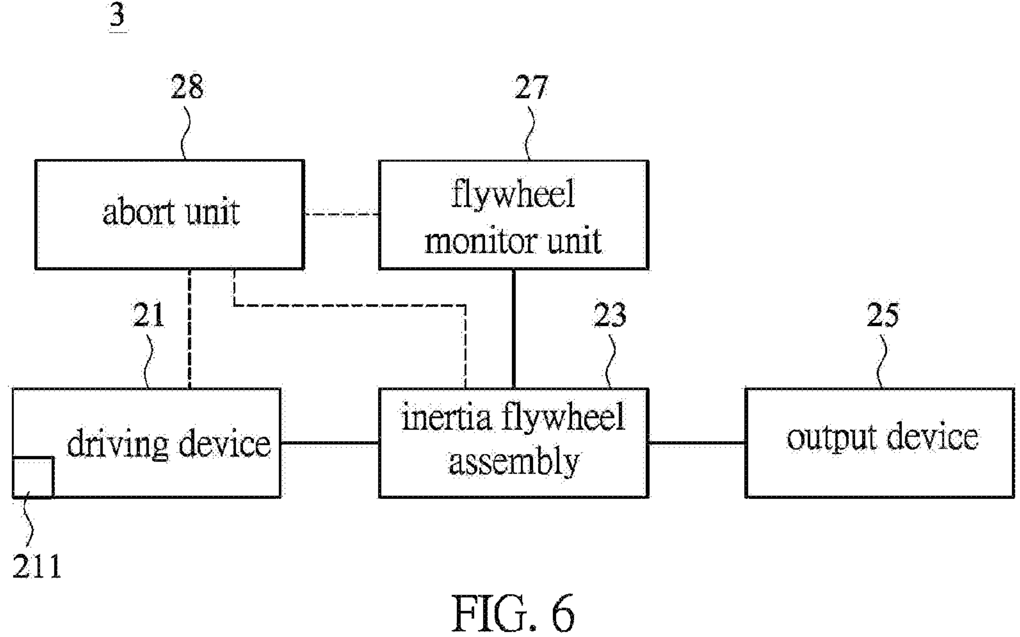
FIG. 6 is a schematic block diagram of a system of inertia flywheel assembly in accordance with one embodiment of the present invention.
Figure 7:
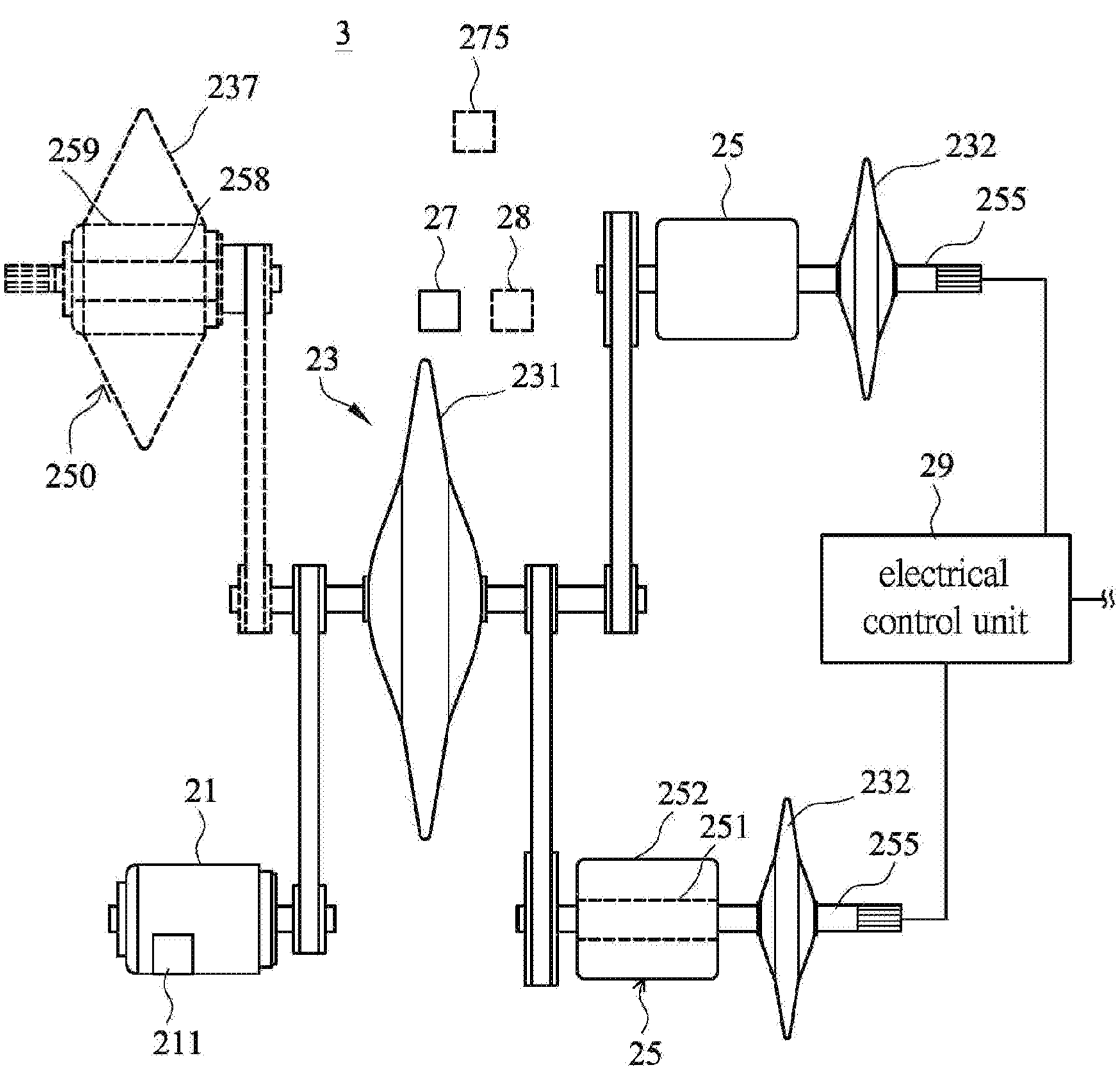
FIG. 7 is a schematic diagram of a system in accordance with one embodiment of the system shown in FIG. 6.

Referring to FIG. 6 and FIG. 7, there are shown a schematic block diagram and a schematic diagram of a system of inertia flywheel assembly in accordance with one embodiment of the present invention. FIG. 7 shows a system in accordance with one embodiment of the system shown in FIG. 6.

The system 3 of inertia flywheel assembly of the present embodiment comprises at least one driving device 21, an inertia flywheel assembly, a flywheel monitor unit 27 and at least one output device 25.

The driving device 21 is an internal combustion engine, motor or driving device which provides mechanical energy for driving the inertia flywheel assembly 23. The driving device 21 further comprises a controller 211 for controlling the output of the driving device 21.

The inertia flywheel assembly 23 can be but not limited to the aforementioned inertia flywheel assemblies. The inertia flywheel assembly 23 is connected to the driving device 21 and is driven by the driving device 21 that the (first) inertia flywheel(s) 231 starts to spin. FIG. 7 discloses an embodiment of the inertia flywheel assembly 23 with an inertia flywheel. In FIG. 7, the driving device 21 is disposed on the side of the inertia flywheel assembly 23 opposite to the output device 25. In the other embodiment, the driving device 21 and the output device 25 may be disposed on the same side of the inertia flywheel assembly 23 for compact or small system, as the dashed line construction 250 of FIG. 7. In the present invention, according to the requirements of the load, the driving device 21 is designed appropriately. By using the transmission member with different diameters, the rotating speeds of the inertia flywheel assembly 23, the driving device 21 and the output device 25 are different. For example, if the transmission member 21 is belt pulley set, assume that the diameter of the belt pulley on the driving device side is half of the diameter of the belt pulley on the inertia flywheel 231 side, the rotating speed of the driving device is double of the rotating speed of the inertia flywheel 231.

The flywheel monitor unit 27 is used for determining the rotating speed of the at least one inertia flywheel 231 of the inertia flywheel assembly 23. The flywheel monitor unit 27 is a contacting or inducting tachometer. The at least one output device 25 is connected to the inertia flywheel assembly 23. The output device 25 may be an electric generator. In one embodiment, the inertia flywheel assembly 23 is coupled to an electronic device or a battery for storing energy. In the present embodiment, an inertia flywheel is coupled to two output devices 25. Furthermore, the embodiment shown in FIG. 7 further comprises an electrical control unit 29. The electrical control unit 29 is selectively one of a rectifier, a regulator, a transformer, a regulating/rectifying unit or a voltage/current transforming unit. The electrical control unit 29 receives electric energy and provides the electric energy to the system itself or the other device. The other device may be an electric grid. In practical operation, the controller 211 controls the driving device 21 to provide an initial output to the inertia flywheel assembly 23. The initial output depends on the amount and the weights of the inertia flywheels 231 in the inertia flywheel assembly 23. The initial output overcomes the starting static friction force of the inertia flywheel assembly 23 (the total static friction force of the assembly) and drives the inertia flywheels 231 of the assembly 23 to start to spin. However, there are friction forces other than the starting static friction force of the inertia flywheel assembly 23, such as friction force of the bearings and the axles, but they are not the points of the present invention.

The flywheel monitor unit 27 monitors the inertia flywheel assembly 23 continuously. Once the rotating speed of the inertia flywheel 231 in the inertia flywheel assembly 23 is raised to a rated revolution, the flywheel monitor unit 27 transmits an adjusting signal to the controller (not shown) to adjust the output of the driving device. The adjusted output is lower than the initial output, since the initial output needs to overcome the starting static friction force of the inertia flywheel assembly 23 which is much greater than the dynamic friction force after starting. The output of the driving device 21 is adjusted to maintain the system 2 to operate.

Comparing to the conventional dynamic device, the system 3 of inertia flywheel assembly of the present invention provides an initial output to start the inertia flywheel assembly 23, and then the output of the driving device 21 is greatly reduced to maintain the operation of the system 3. Consequently, the energy consumption of the system 3 of the present invention is much lower than the conventional dynamic system.

For example, if the present invention is applied to the solar power system, the driving device 21 is the combination of solar panels, internal combustion engine, motor and regulating/rectifying unit. The electric energy obtained by the solar panels is stored in a battery via the regulating/rectifying unit, and then is provided to the motor or internal combustion engine to start and maintain the operation of the system 3 of inertia flywheel assembly. The energy stored in the system 3 of the present invention can further provide to output devices (such as electric generator). After the rotating speed of the inertia flywheel is raised to the rated revolution, the output of the solar power system is greatly reduced, and then the electric energy obtained by the solar panels and the system 3 may be stored in a battery or provided to other loads or the electric grid.

If the present invention is applied to the hydraulic power system or wind drive power system, the driving device 21 is the water turbine of the hydraulic power system or wind turbine of the wind drive power system. If the present invention is applied to renewable energy power system, the driving device 21 is the internal combustion engine.

In one embodiment of the present invention, the system 3 further comprises a system monitor unit 275 for monitoring the statuses of the at least one driving device 21, the inertia flywheel assembly 23 and the at least one output device 25. The system monitor unit 275 is used to prevent the inertia flywheel from stalling or dropping out because of jitter or anomaly.

For example, the system monitor unit 275 may connect to the flywheel monitor unit 27 to monitor the rotating speed of the inertia flywheel 231 in the inertia flywheel assembly 23. In one embodiment, the system monitor unit 275 can also monitor all or a part of rotary members. The system monitor unit 275 may be a vibration monitor unit for monitoring the vibration of the axle of the inertia flywheel or the vibration of the system 3. The system monitor unit 275 can also be connected to the output device 25 to monitor the operation status, electric power and output of the system.

Moreover, the system monitor unit 275 can be remotely controlled by wireless network, Bluetooth or infrared. In one embodiment, a plurality of system monitor units 275 of different systems can be connected to a center monitor to monitor a plurality of systems at once.

The present invention further comprises an abort unit 28 connected to the system monitor unit 275. When the system monitor unit 275 detects an anomalous condition, the abort unit 28 is triggered by the system monitor unit 275 to stop the system.

In particular, when the system monitor unit 275 detects over-speed of the inertia flywheel 231, anomalous vibration of the axle, anomalous vibration of the flywheel body, dropping or shift of the axle, over-vibration of the system plane, or anomalous output of the output device 25, the system monitor unit 275 transmits an anomalous signal to the abort unit 28, and the abort unit 28 transmits an abort signal to the at least one driving device 21 or directly stop the operation of the inertia flywheel assembly 23 to prevent the system from accident. After stopping, the system can be repaired by engineers.

Furthermore, the system 3 can further comprise a plurality of dampers (not shown) for reducing the vibration of the system. The situations of axle shift or assembly shift can be reduced. The energy consumption caused by system vibration can also be reduced and the efficiency of the system is improved. The dampers are disposed on the inertia flywheel assembly 23 or the housing of the system 3 to reduce vibration. Moreover, the dampers can also prevent the system from being damaged during an earthquake. In one embodiment of the invention, an output shaft 255 of the output device 25 is connected to a (second) inertia flywheel 232 to drive the second inertia flywheel 232 rotating. When the driving power of the output shaft 255 decreases, the second inertia flywheel 232 is able to drive the output shaft 255 rotating to provide or maintain output power.

Further, the output device 25 may comprise an inner rotor 251 and an outer rotor 252. In other embodiment of the invention, the output device 250 may also comprise an inner rotor 258 and an outer rotor 259, and the outer surface of the outer rotor 259 is connected to a inertia flywheel plate 237. Thus, the inertia flywheel plate 237 and the outer rotor 259 are combined to form an inertia flywheel.

Figure 8:
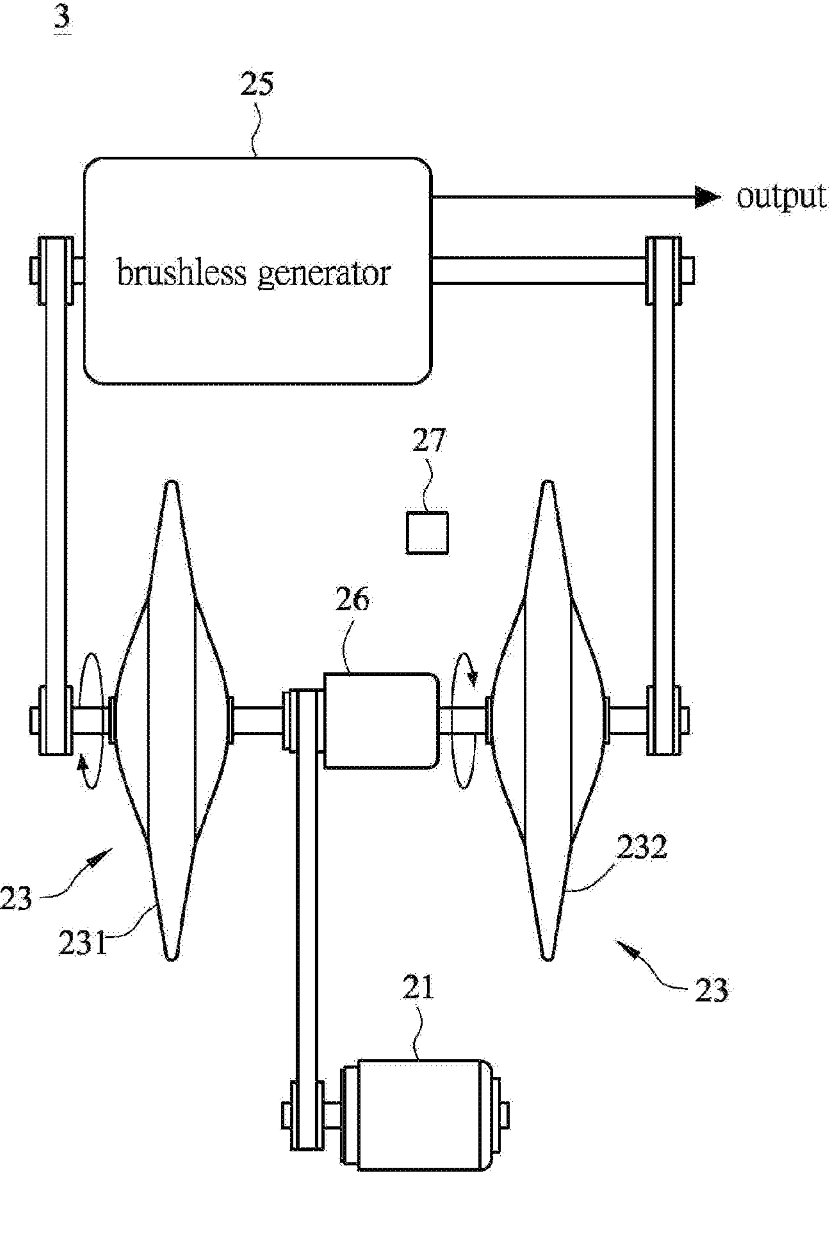
FIG. 8 is a schematic diagram of a system in accordance with another embodiment of the system shown in FIG. 6.

Referring to FIG. 8, there is shown a schematic diagram of a system in accordance with another embodiment of the system shown in FIG. 6. The system 3 of the present embodiment comprises at least one driving device 21, an inertia flywheel assembly 23, a flywheel monitor unit (27) and at least one output device 25. In the present embodiment, the output device 25 is a brushless generator.

In the present embodiment, the inertia flywheel assembly 23 comprises two inertia flywheels, such as the first inertia flywheel 231 and the second inertia flywheel 232, disposed on two sides of the driving device 21. The present embodiment further comprises an inverse member 26 having a plurality of gears. The driving device 21 drives the inverse member 26. The gears in the inverse member are connected to the first inertia flywheel 231 and the second inertia flywheel 232 to drive the first inertia flywheel 231 and the second inertia flywheel 232 to spin in reverse directions. The first inertia flywheel 231 and the second inertia flywheel 232 are connect to a magnetic rotor and an armature rotor of the brushless generator (output device 25) to drive the magnetic rotor and the armature rotor to spin in reverse directions. Comparing to the conventional generator, the generator of the present embodiment produces much electric energy by cutting much greater amount of magnetic lines than the conventional generator, since the relative rotating speed is double of the conventional generator.

Figure 9:
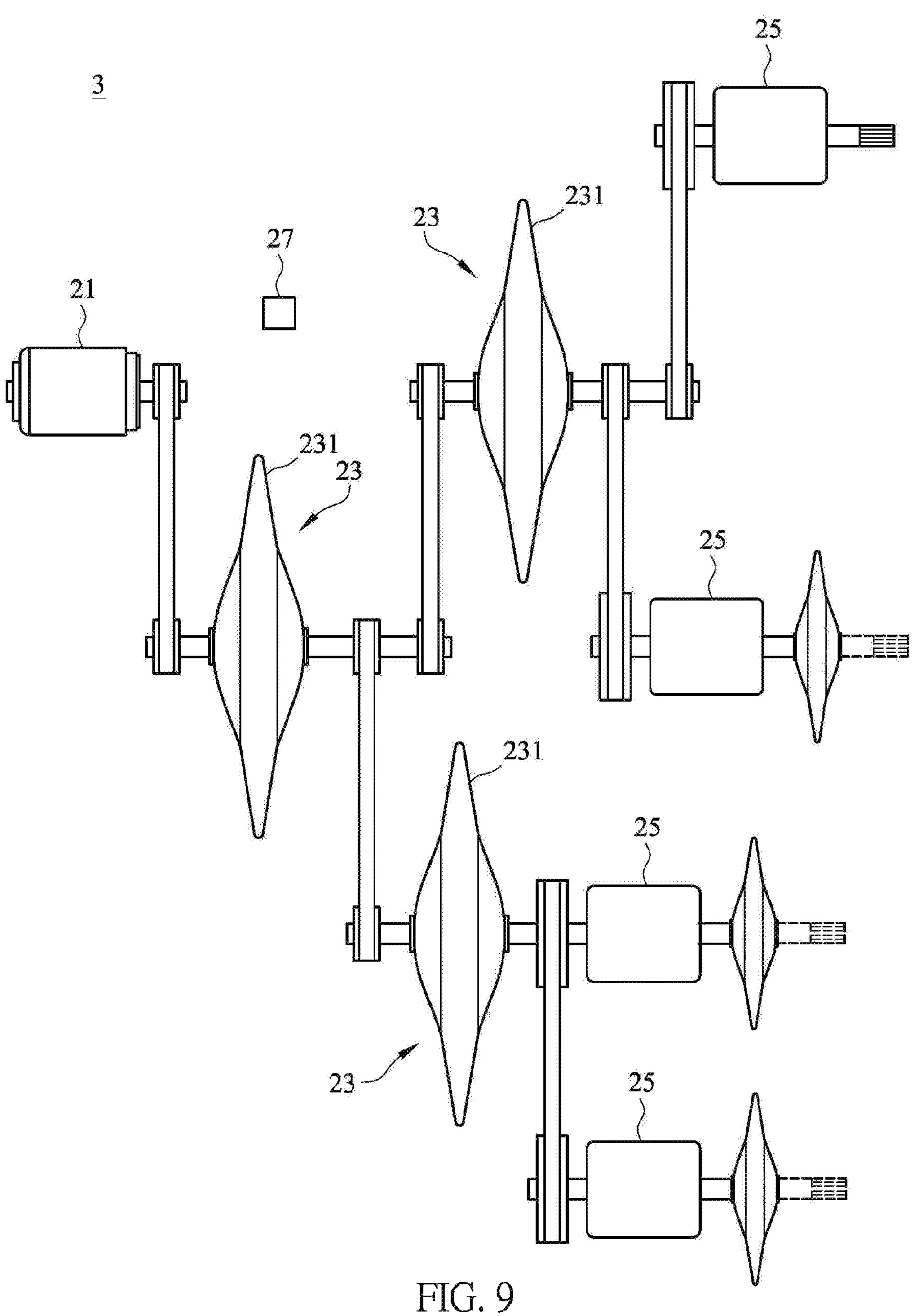
FIG. 9 is a schematic diagram of a system in accordance with still another embodiment of the system shown in FIG. 6.

Referring to FIG. 9, there is shown a schematic diagram of a system in accordance with still another embodiment of the system shown in FIG. 6. The system 3 of the present embodiment comprises at least one driving device 21, an inertia flywheel assembly 23, a flywheel monitor unit (27) and at least one output device 25.

The inertia flywheel assembly 23 of the present embodiment comprises three inertia flywheels 231 disposed uncoaxially. Two of the inertia flywheels 231 are connected to two output devices 25 respectively.

The plurality of output devices 25 are connected to electrical control unit (29). The electric energy generated by the output devices 25 is stored to batteries, transmits to the system itself or output to other device via the electrical control unit 29. The other device may be an electric grid.

Figure 10:
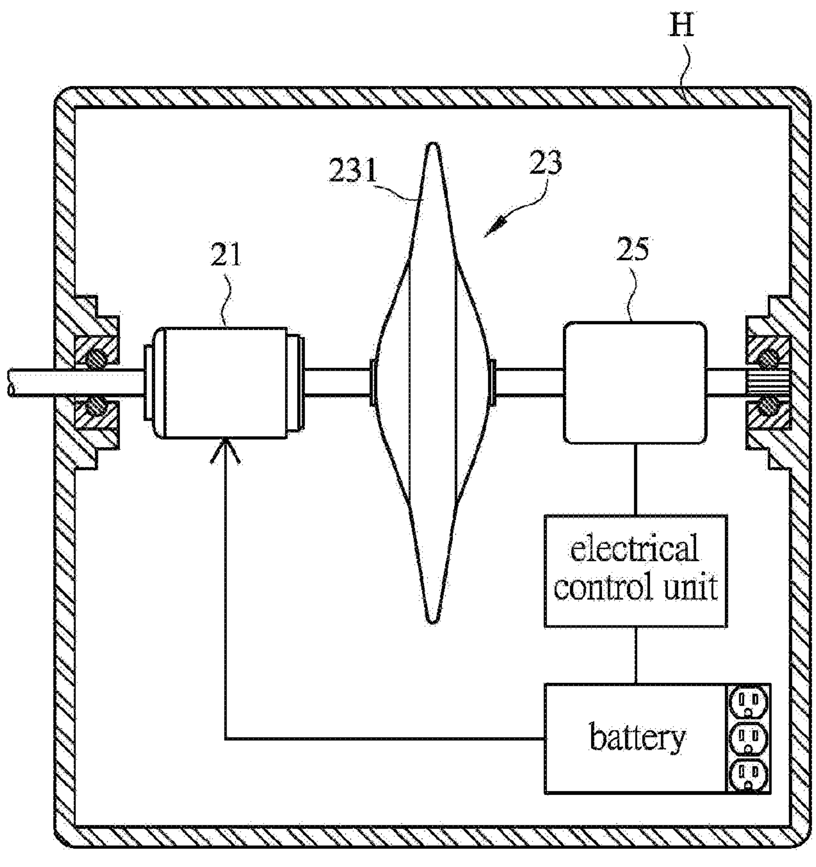
FIG. 10 is a schematic diagram of a system in accordance with still another embodiment of the system shown in FIG. 6.

Referring to FIG. 10, there is shown a schematic diagram of a system in accordance with still another embodiment of the system shown in FIG. 6. In the present embodiment, the driving device 21 is directly connected to one inertia flywheel 231 of the inertia flywheel assembly 23. Moreover, the driving device 21, the inertia flywheel assembly 23 and the output device 25 are integrated to a single member. The single member further comprises an electrical control unit 29 and a battery. The output device 25 is connected to the electrical control unit 29. The electric energy generated by the output device 25 is stored in the battery via the electrical control unit 29. A plurality of sockets are disposed on the battery to output electric energy to other device or the driving device 21. The driving device 21 can provide mechanical energy to the inertia flywheel assembly 23 or output mechanical energy to other device. The configuration of the single member can be coupled to other conventional modules to receive or provide mechanical energy.

In summary, by using the present invention, the output of the driving device is greatly reduced after the rotating speed of the inertia flywheel is raised to the rated revolution that greatly reduces the energy consumption of the conventional dynamic system and improves efficiency of the generator system.

The flywheel body of the inertia flywheel in the present invention is an arc-shaped plate with a buckled center portion and a flat surrounding portion which is novel and different from the conventional inertia flywheel. The design of the inertia flywheel assembly and the system thereof of the present invention provides much higher efficiency than the conventional design and should be inventive. Furthermore, the function and efficiency of the inertia flywheel assembly and the system thereof of the present invention are all experimentally proved to be functional for business operation.

What are described above are merely embodiments of the present invention, and are not intended to limit the implementation scope of the present invention. Equivalent variations and modifications made without departing from the shape, structure, feature, method and spirit described in the scope of the claims of the present invention shall all fall within the scope of the claims of the present invention.

What is claimed is:

1. A system of inertia flywheel assembly, comprising:

a driving device;

an inertia flywheel assembly including:

a first inertia flywheel and at least one second inertia flywheel, wherein each inertia flywheel has a flywheel body and an axle, the axle is fixed to an axis of the flywheel body and the flywheel body could spin via the axle;

wherein a first transmission portion is disposed on a circumference of the flywheel body of the first inertia flywheel, a second transmission portion is disposed on the axle of each second inertia flywheel and is coupled to the first transmission portion;

a transmission member connected between the driving device and the axle of the first inertia flywheel; and at least one output device connected to the axle of the at least one second inertia flywheel.

2. The system as claimed in claim 1, further comprising an electrical control unit connected to the at least one output device.

3. The system as claimed in claim 1, wherein the output device further comprises an inner rotor and an outer rotor.

4. The system as claimed in claim 1, wherein the output device further comprises an inner rotor and an outer rotor, and an outer surface of the outer rotor is connected to an inertia flywheel plate.

5. The system as claimed in claim 1, wherein the output device further comprises an output shaft connected to an inertia flywheel.

6. The system as claimed in claim 1, wherein the flywheel body is a streamlined body that is a spherical or an ellipsoid body having at least arc-shaped plate, or a conical shape body having at least one straight line.

7. The system as claimed in claim 1, further comprising a flywheel monitor unit configured to detect rotating speeds of the inertia flywheels of the inertia flywheel assembly, wherein the driving device comprises a controller for controlling the driving device to provide an initial output to start the inertia flywheel assembly, when the rotating speeds of the inertia flywheels in the inertia flywheel assembly are raised to rated revolutions, the flywheel monitor unit transmits an adjusting signal to the controller to adjust the output of the driving device.

* * * * *